Oct. 22, 1968    J. F. HOBBINS    3,406,588
REVERSE GEAR LOCKOUT LEVER

Filed March 2, 1967    2 Sheets-Sheet 1

INVENTOR
JAMES D. HOBBINS
BY *Louis Necho*
atty

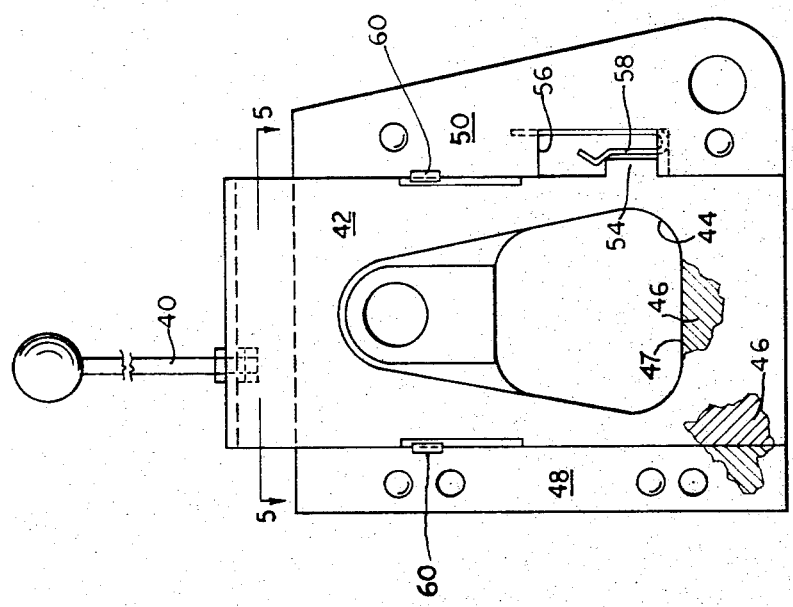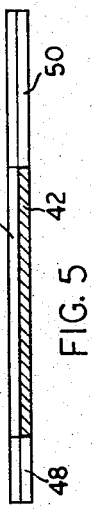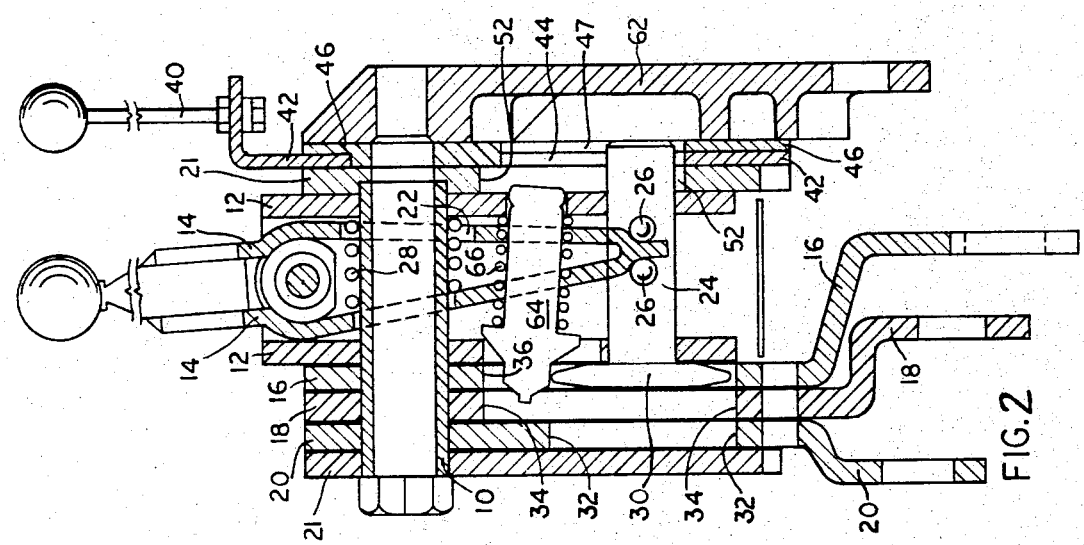

United States Patent Office 3,406,588
Patented Oct. 22, 1968

3,406,588
REVERSE GEAR LOCKOUT LEVER
James F. Hobbins, Philadelphia, Pa., assignor to Hurst-Campbell, Inc., Warminster, Pa., a corporation of Pennsylvania
Filed Mar. 2, 1967, Ser. No. 620,122
7 Claims. (Cl. 74—476)

ABSTRACT OF THE DISCLOSURE

Means for positively preventing unintended shifting of a transmission into reverse gear including a plurality of gear shifting levers, a pin selectively engageable with any lever, obstructing means for preventing the engagement of said pin with one of said levers, said obstructing means being selectively movable to a position obstructing the movement of said pin into engagement with one of said levers and also movable to a position wherein the movement of said pin into engagement with one of said levers is unobstructed.

Summary of invention

A separately operable slide movable to one position in which it permits, and to another position it prevents, shifting the transmission of an engine into reverse gear.

The drawings

FIG. 1 is a vertical sectional view of four forward speed gear shifting mechanisms provided with a reverse lockout slide embodying the invention, the same being shown in its raised, reverse gear shifting blocking position.

FIG. 2, showing the reverse locking slide in nonblocking lockout slide in its lowered, or in its nonblocking position.

FIG. 4 is a side elevational view of the lever shown in FIG. 2, showing the reverse locking slide in non-blocking position in FIG. 2.

FIG. 5 is a sectional view looking in the direction of line 5—5 of FIG. 4.

Figure 6:
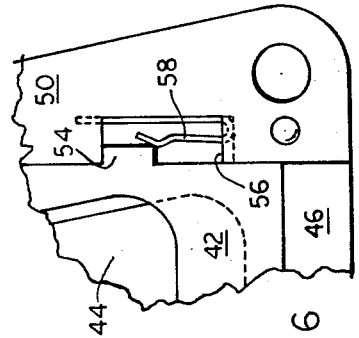
FIG. 6 is a view showing the lower right-hand corner of FIG. 4 with the slide lever in its raised, blocking position of FIG. 1.

The gear shifting mechanism illustrated forms no part of the invention and is only shown and described to the extent needed to provide the background necessary to explain the invention. Briefly, the shifting mechanism includes an assembly sleeve 10 which passes through the limbs 12 of a fixed U-shaped housing; through shifting stick 14; through reverse gear actuating lever 16; through first and second forward speed gear actuating lever 18; through third and fourth speed gear actuating lever 20; and through outer fixed assembly plates 21. The manner in which a gear shifting mechanism of this type operates is shown in recently issued patents, but to make reference to any prior patents unnecessary, it is pointed out that shift-stick 14 and levers 16, 18 and 20, are rotatable transversely of the axis of sleeve 10 and that shift-stick 14 is also rockable in the direction of the longitudinal axis of the sleeve. This is made possible by making opening 22 in the shift-stick a bit larger than the outside diameter of the sleeve. It should also be pointed out that the lower end of the shift stick is in the form of a yoke which detachably engages gear selector pin 24 by means of studs 26, or the like, which project from pin 24 to either side of the yoke. Shift stick 14 is biased by spring 28 in a direction to move the head 30 of pin 24 into engagement with opening 32 in third and fourth gear actuating lever. To engage head 30 of pin 24 with opening 34 in first and second forward gear actuating lever 18, the shifting stick must move against the force of spring 28. To engage the head 30 of selector pin 24 with opening 36 in reverse gear actuating lever 16, the stick must be moved still further against the force of the already partly compressed spring.

For normal driving, the increased resistance of the spring is enough to inform the operator that he is moving into reverse gear, and he will have time to change directions if he had no intention to shift into reverse. But, in competition driving where rapid acceleration is needed, the shift stick is "slammed" into one position or another, and an inadvertent shifting into reverse can be calamitous.

Figure 1:
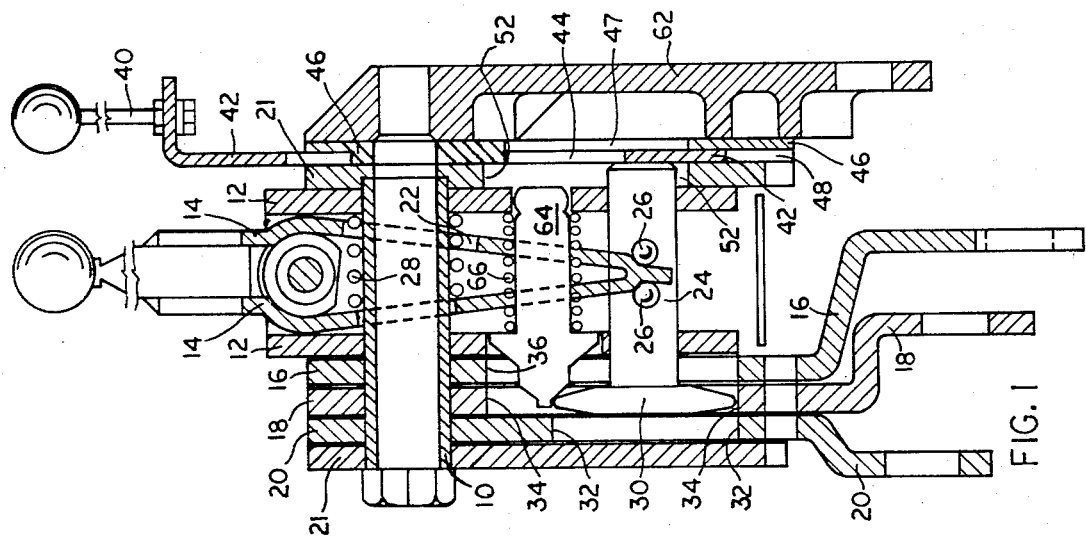

To guard against this danger, I provide an auxiliary handle 40 which is secured to the upper end of a slide 42 for raising and lowering the latter as shown in FIGS. 1 and 2. Slide 42 is provided with an opening 44 and is adapted to slide against backup plate 46 and between two guides 48 and 50. Backup plate 46 is provided with an opening 47 which is similar to, and registers with, opening 44. In its lower position, as in FIGS. 2, 3, and 4, the bottom edge of slide 42 is flush with the bottom edge of backup plate 46. In this position, the bottom edge of opening 44 in the slide is flush with the bottom edge of corresponding opening 52 in assembly plate 21, and pin 24 can project into opening 44. This permits movement of pin 24 far enough to the right to bring its head 30 into opening 36 in reverse gear actuating lever 16. Conversely, when slide 42 is moved up to the position of FIGS. 1 and 6, the lower portion of slide 42 obstructs the movement of pin 24 and makes it impossible to move its engaging head 30 into opening 36 in the reverse gear actuating lever.

To limit the upward and downward motion of the slide it is provided with a lug 54 which is movable in a recess 56 formed in guide 50, to the upper and lower positions of FIGS. 4 and 6. A spring 58 is mounted in recess 56, always engaging lug 54 in its upper or lower position as shown in FIGS. 4 and 6. Spring 58 serves as a detent to indicate the arrival of lug 54 at its upper, or lower position, and it tensions slide 42 against rattling.

Figure 3:
FIG. 3 is an end elevational view of the reverse lockout side shown detached.

Projections 60, which are staked out of guides 48 and 50, serve to confine slide 42 in position before the subassembly of FIGS. 3 and 4 is applied to plate 21, or its equivalent. 62 is a cover plate which, except for keeping the subassembly of FIGS. 3 and 4 in position, forms no part of the invention. 64 designates an auxiliary pin which is tensioned by spring 66. This pin which is disclosed in Patent No. 3,306,196 also forms no part of the present invention and therefore is not described.

What I claim is:
1. A gear shifting mechanism including:
   a first lever having a neutral position and first gear shifting positions,
   a second lever having a neutral position and a second gear shifting position,
   means mounting said levers in spaced, parallel vertical planes,
   there being a first opening in said first lever and a second opening in said second lever,
   said openings coinciding with each other when said levers are in their neutral positions,
   a gear selector pin mounted for movement along a longitudinal axis towards, and away from, said levers,
   a shift stick connected to said pin and operative to move it to a first predetermined distance to insert one end of said pin into said second opening, and to a second, greater distance to pass said one end of said pin through said first, and into, said second opening,
   a fixed plate adjacent the other end of said pin and having a third opening into which said other end of said pin must pass when said one end of said pin is in engagement with said second opening, and obstructing means movable to a first position in which it prevents entry of said other end of said pin into said third opening, and prevents entry of said one end of said pin into said second opening, said obstructing means being movable to a second position out of third opening obstructing position and permitting entry of said one end of said pin into said second position.

2. The gear shifting mechanism of claim 1 wherein said obstructing means is a vertically movable slide located between said other end of said pin and said third opening, and an operating handle disposed adjacent said shift stick and connected to said slide for moving it to either of its first or second positions.

3. The gear shifting mechanism of claim 1 wherein said obstructing means is a vertically movable slide located between said other end of said pin and said third opening, and an operating handle disposed adjacent said shift stick and connected to said slide for moving it upwardly to its first, or downwardly to its second positions, there being a fourth opening in said slide which, in the first position of said slide is out of registration with said third opening and which, in the second position of said slide, coincides with said third opening.

4. A gear shifting mechanism including:

a first lever having a neutral position and forward gear shifting positions, a second lever having a neutral position and a reverse gear shifting position, means mounting said levers in spaced, parallel vertical planes, there being a first opening in said first lever and a second opening in said second lever, said openings coinciding with each other when said levers are in their neutral positions, a gear selector pin mounted for movement along a longitudinal axis towards, and away from, said levers, a shift stick connected to said pin and operative to move it to a first predetermined distance to insert one end of said pin into said second opening, and to a second, greater distance to pass said one end of said pin through said first, and into, said second opening, a fixed plate adjacent the other end of said pin and having a third opening into which said other end of said pin must pass when said one end of said pin is in engagement with said second opening, and means for selectively obstructing and non-obstructing said third opening, said means comprising:

a fixed back-up plate having a fourth opening therein, a slide movable vertically against said back-up plate to an upper and to a lower position, there being a fifth opening in said slide which is so located that, in the lower position of said slide, the lower edge of said fifth opening coincides with the lower edge of said fourth opening, and so that, in the upper position of said slide, the lower edge of said fifth opening is higher than the lower edge of said fourth opening and obstructs the lower portion of said fourth opening, and means for moving said slide to either of its positions.

5. The gear shift mechanism defined in claim 4, and guides carried by said back-plate and bearing against the vertical edges of said slide, and a spring carried by one of said guides and bearing against the adjacent vertical edge of said slide.

6. The gear shifting mechanism defined in claim 4 wherein one of said guides is provided with a recess and wherein the adjacent edge of said slide is provided with a lug protruding into said recess for limiting the movement of said slides, and a spring in said recess, engaging the upper or the lower edge of said lug yieldably to retain said slide in its upper or in its lower position, and to discourage rattling.

7. The gear shifting mechanism defined in claim 5, and projections carried by said guides and engaging the vertical edges of said slide for slidably securing said slide to said backup plate.

References Cited

UNITED STATES PATENTS

| | | | |
|---|---|---|---|
| 1,862,098 | 6/1932 | Sheldrick | 74—476 |
| 3,082,638 | 3/1963 | Nilson | 74—473 |
| 3,164,030 | 1/1965 | Fodrea et al. | 74—476 |
| 3,216,274 | 11/1965 | Hurst et al. | 74—476 |
| 3,306,126 | 2/1967 | Hobbins | 74—473 |
| 3,323,387 | 6/1967 | Hurst et al. | 74—476 |
| 3,329,039 | 7/1967 | Johnson | 74—473 |

FOREIGN PATENTS

| | | |
|---|---|---|
| 862,614 | 3/1961 | Great Britain. |

FRED C. MATTERN, Jr., *Primary Examiner.*

B. T. CALLAHAN, *Assistant Examiner.*